Dec. 15, 1959   H. J. LAFAYE   2,917,098
TUBELESS TIRE RIM VALVE
Filed May 4, 1956
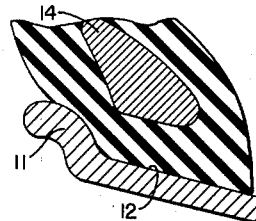
FIG. 1
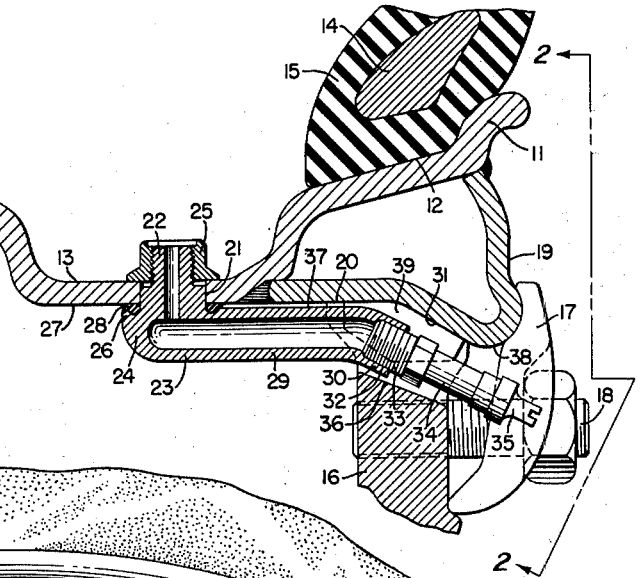
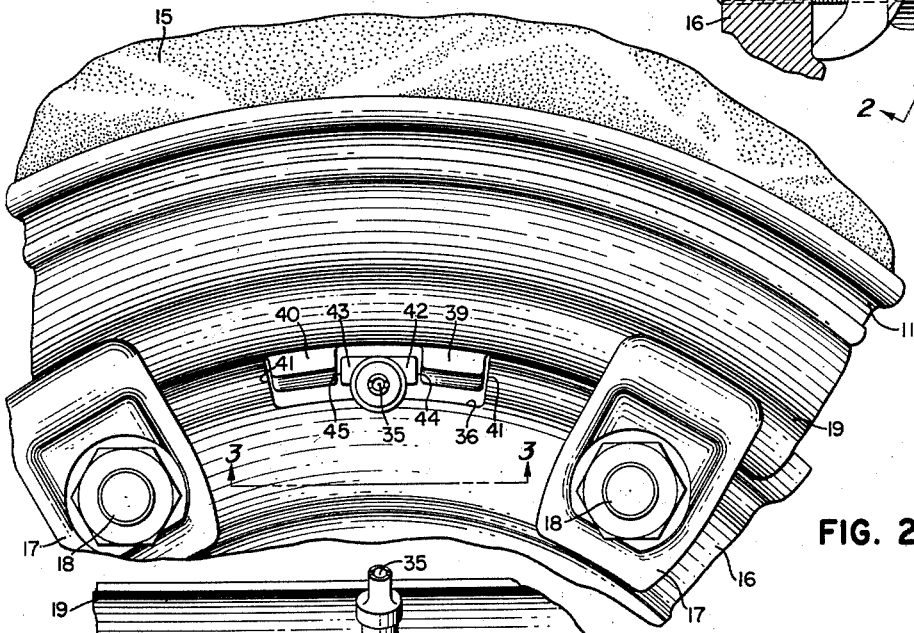
FIG. 2
FIG. 3
INVENTOR.
HILTON J. LAFAYE
BY
ATTORNEY United States Patent Office 2,917,098
Patented Dec. 15, 1959

2,917,098

TUBELESS TIRE RIM VALVE

Hilton J. Lafaye, Akron, Ohio, assignor to The Goodyear Tire & Rubber Company, Akron, Ohio, a corporation of Ohio Application May 4, 1956, Serial No. 582,743

2 Claims. (Cl. 152—427)

The present invention relates to valves for inflating tubeless tires, and more particularly to removable valves for use with demountable truck tire rims.

With the advent of tubeless tires for use on trucks a serious problem has been presented in obtaining the required fluid-tight seal between the valve stem and the rim, and preventing rotation of the valve relative to the rim so that the seal is maintained. Permanent attachment of the valve stem to the rim simplifies the problem of obtaining an airtight seal but such construction is not desirable because the valve cannot be readily replaced. Another expedient has been to use a short tank valve secured at the end of a hole drilled or otherwise formed laterally of the rim. However, this construction materially decreases the strength of the rim and is therefore undesirable. In addition to the problems discussed above, known tubeless truck tire valves project a substantial distance from the radially inner surface of the rim so that the diameter of the brake drum is restricted because substantial clearance must be maintained between the brake drum and the rim to provide space within which the valve may be positioned.

An object of this invention is to provide a valve for use with tubeless truck tire rims which is removably secured to the rim and provided with means for preventing the valve stem from turning relative to the rim.

A further object of this invention is to provide a valve of the character described extending from the valve rim hole to the gutter edge of the rim and disposed substantially radially outward of the gutter edge.

Another object of this invention is to provide a valve stem of the character described in which the stem is made of two parts, both parts being removable from the rim and valve assembly for replacement purposes.

The features and advantages of this invention will become more readily apparent from the following description and the accompanying drawings in which Fig. 1 is a cross-sectional view of a tire and demountable rim showing the valve of this invention in longitudinal cross section;

Fig. 2 is a fragmentary side elevational view of the tire rim wheel and valve assembly of this invention taken along the lines 2—2 of Fig. 1;

Fig. 3 is a cross-sectional view taken along the lines 3—3 of Fig. 2, showing the valve in longitudinal plan view.

Referring now to the drawing more in detail, it will be seen by reference to Fig. 1 that the invention comprises a rim 10 having integral side flanges 11 and a bead seat 12 which merges into a rim base 13. The beads 14 of the tire 15 bear against the flanges 11 and bead seat 12. The rim 10 is connected to the wheel 16 by means of clamping lugs 17 secured to the wheel by the studs 18 so as to clamp the gutter edge 19 between the lugs 17 and the radially outer edge 20 of the wheel.

The rim base 13 is provided with a valve hole 21 through which the head 22 of the valve stem 23 projects. The head 22 is integrally formed on the inner end 24 of the stem 23 and is provided with external threads engaged by the nut 25. The inner end 24 of the stem 23 is provided with a flange 26 for engagement with the radially inner surface 27 adjacent the valve rim hole and a rubber O-ring 28 is preferably disposed between the radially inner surface 27 at the rim base 13 and the flange 26 to effect an airtight seal between the valve stem and the rim.

The intermediate portion 29 of the valve stem 23 extends from the inner end 24 thereof axially of the rim toward the gutter edge 19 and the outer end 30 of the stem extends at an angle to the intermediate portion 29 in a direction radially inwardly of the rim and substantially parallel to the surface 31 of the gutter edge. The outer end 30 of the stem is provided with internal threads 32 engaging the externally threaded inner end 33 of the tank valve or tubular member 34 having a conventional valve core 35 therein. The member 34 preferably projects laterally of the wheel 16 through a suitable groove 36 provided in the wheel 16 as shown in Fig. 2.

The intermediate portion 29 of the stem extends substantially parallel to the radially inner surface 27 of the rim and the radially outer surface 37 of the intermediate portion 29 is disposed in a plane displaced from the radially inner surface 27 of the rim not more than 1/16 of an inch. The juxtaposition of the intermediate portion 29 of the stem relative to the radially inner surface 27 of the rim permits the major portion of the cross-sectional area of the inner end 24 and intermediate portion 29 to be located radially outward of the radially innermost edge 38 of the gutter edge 19.

A pair of spaced driving lugs 39 and 40 are secured to the surface 31 of the rim so that a lateral edge of each lug is disposed adjacent to an edge of the slot 41 formed in the wheel 16. The driving lugs prevent relative movement between the wheel 16 and the rim 10 in the event that an extremely large force is applied to the wheel overcoming the friction between the lugs 17 and the gutter edge 19. As shown in Figs. 2 and 3, the outer end 30 of the stem 23 extends between the spaced lugs 39 and 40 and is provided with a pair of laterally extending ears 42 and 43 having terminal or end surfaces 44 and 45 which terminate in juxtaposition relative to the driving lugs 39 and 40.

It will be seen that in the event a force is applied to the tubular member 34 tending to rotate the stem relative to the valve rim hole, one of the surfaces 44 or 45 of the ears 42 and 43 will abut against the adjacent lug 39 or 40 and prevent movement thereof and the force will be absorbed by the tubular member rather than by the stem 23. However, should the tubular member 34 be thus damaged it may be readily and economically replaced by merely unscrewing the member 34 from the stem 23 and substituting a new member.

While certain representative embodiments and details have been shown for the purpose of illustrating the invention, it will be apparent to those skilled in this art that various changes and modifications may be made therein without departing from the spirit or scope of the invention.

I claim:

1. A demountable rim and valve stem assembly adapted for use with a tubeless tire comprising a rim having a gutter edge surface depending radially inwardly from said rim for securing said rim to a wheel, said rim having a valve hole in the base thereof, a valve stem having an inner end, an intermediate portion and an outer end, said inner end having a head projecting through the valve hole, means threadedly secured to said head and engaging the radially outer surface of the rim, said inner end having a flange larger than the diameter of the valve hole, resilient means compressed between said flange and the radially inner surface of the rim adjacent the valve hole for effecting an airtight seal therebetween, said intermediate portion extending parallel and in juxtaposition to the radially inner face of said rim base from the valve hole toward the gutter edge, said outer end extending at an obtuse angle to said intermediate portion and parallel to said radially extending surface of the gutter edge, the major part of the cross-sectional area of said inner end and intermediate portion of said stem disposed radially outward of the radially innermost extremity of the gutter edge, a tubular member removably secured to said outer end extending parallel to said gutter edge and terminating adjacent the radially innermost extremity of the gutter edge, and a valve core disposed within said tubular member.

2. A rim and valve assembly as claimed in claim 1 in which said rim is provided with a pair of spaced driving lugs adjacent the gutter edge, the outer end of said stem terminating between said lugs, said outer end having a pair of ears projecting therefrom the ends of which terminate respectively in juxtaposition to said lugs.

References Cited in the file of this patent

UNITED STATES PATENTS

| | | |
|---|---|---|
| 1,272,342 | ONeal | July 9, 1918 |
| 2,197,608 | Burger | Apr. 16, 1940 |
| 2,246,017 | Sinclair | June 17, 1941 |
| 2,685,907 | Waddell | Aug. 10, 1954 |
| 2,825,961 | Woodward | Mar. 11, 1958 |

FOREIGN PATENTS

| | | |
|---|---|---|
| 706,143 | Great Britain | Mar. 24, 1954 |
| 725,767 | Great Britain | Mar. 9, 1955 |